(12) United States Patent
Brown et al.

(10) Patent No.: US 10,594,839 B2
(45) Date of Patent: Mar. 17, 2020

(54) VIRTUAL ASSISTANT SKILL DEPLOYMENT

(71) Applicant: Microsoft Technology Licensing, LLC, Redmond, WA (US)

(72) Inventors: Dorrene Brown, Redmond, WA (US); David Brett, Seattle, WA (US); Adarsh Sridhar, Issaquah, WA (US); Yujia Liu, Zibo (CN); Eugeniya Salatovka, Redmond, WA (US); James Francis Gilsinan, IV, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 15/623,142

(22) Filed: Jun. 14, 2017

(65) Prior Publication Data

US 2018/0332141 A1 Nov. 15, 2018

Related U.S. Application Data

(60) Provisional application No. 62/503,632, filed on May 9, 2017.

(51) Int. Cl.
*H04L 29/08* (2006.01)
*G06F 8/61* (2018.01)
(Continued)

(52) U.S. Cl.
CPC ............. *H04L 67/34* (2013.01); *G06F 8/60* (2013.01); *G06F 8/61* (2013.01); *H04L 67/20* (2013.01);
(Continued)

(58) Field of Classification Search
CPC ..... G06F 8/60; G06F 8/61; G06F 8/65; G06F 8/76; G06F 11/36; G06F 11/3604;
(Continued)

(56) References Cited

U.S. PATENT DOCUMENTS 7,434,217 B2 * 10/2008 Morris ...................... G06F 8/61
717/177
8,838,635 B2 * 9/2014 Mulligan .................. G06F 8/61
707/759

(Continued)

OTHER PUBLICATIONS

Isbitski, "Improve Skill Quality with the New Beta Testing Tool for Alexa Skills (Beta)", Alexa Blogs, published Apr. 18, 2017, <https://developer.amazon.com/blogs/alexa/post/42e7de5c-f7ef-4e3e-8391-c61fe24f6caa/improve-skill-quality-with-the-new-beta-testing-tool-for-alexa-skills-beta> (Year: 2017).*

(Continued)

*Primary Examiner* — Vivek Srivastava
*Assistant Examiner* — William C McBeth
(74) *Attorney, Agent, or Firm* — Jeffrey L. Ranck; Ranck IP Law

(57) ABSTRACT

Among other things, embodiments of the present disclosure help improve virtual assistant systems by providing dynamic, customizable deployment groups for virtual assistant software features. Users, such as software developers, can deploy and remove software packages from different groups, and precisely define the members in any number of different deployment groups that can access the deployed virtual assistant software.

20 Claims, 10 Drawing Sheets

(51) Int. Cl.
*G06F 8/60* (2018.01)
*H04L 29/06* (2006.01)
*G06F 8/65* (2018.01)
*G06F 11/36* (2006.01)
*G06F 8/76* (2018.01)

(52) U.S. Cl.
CPC .............. *G06F 8/65* (2013.01); *G06F 8/76* (2013.01); *G06F 11/36* (2013.01); *G06F 11/3604* (2013.01); *G06F 11/3668* (2013.01); *H04L 67/42* (2013.01)

(58) Field of Classification Search
CPC .......... G06F 11/3668; G06F 8/62; G06F 8/70; G06F 8/71; H04L 67/20; H04L 67/34
See application file for complete search history.

(56) References Cited

U.S. PATENT DOCUMENTS

| | | | |
|---|---|---|---|
| 9,081,411 B2 | 7/2015 | Kalns et al. | |
| 9,547,564 B1* | 1/2017 | Troutman | G06F 8/61 |
| 2002/0013827 A1* | 1/2002 | Edstrom | H04L 67/306 |
| | | | 709/219 |
| 2002/0152290 A1* | 10/2002 | Ritche | G06F 8/60 |
| | | | 709/221 |
| 2003/0046675 A1* | 3/2003 | Cheng | G06F 8/61 |
| | | | 717/173 |
| 2007/0016961 A1* | 1/2007 | Vogler | G06F 8/62 |
| | | | 726/30 |
| 2008/0098099 A1* | 4/2008 | Khasnis | G06F 8/61 |
| | | | 709/222 |
| 2009/0300586 A1* | 12/2009 | Bernardini | G06F 8/61 |
| | | | 717/126 |
| 2010/0146500 A1* | 6/2010 | Joubert | G06F 8/61 |
| | | | 717/178 |
| 2010/0262619 A1* | 10/2010 | Zargahi | G06F 8/61 |
| | | | 707/770 |
| 2010/0262959 A1* | 10/2010 | Bruno | G06F 21/6209 |
| | | | 717/171 |
| 2011/0111743 A1* | 5/2011 | Boukai | G06F 8/61 |
| | | | 455/419 |
| 2012/0151211 A1* | 6/2012 | Kreiner | H04L 63/102 |
| | | | 713/168 |
| 2012/0255007 A1* | 10/2012 | Yang | G06F 8/61 |
| | | | 726/23 |
| 2013/0212160 A1* | 8/2013 | Lawson | G06F 8/60 |
| | | | 709/203 |
| 2015/0143345 A1* | 5/2015 | Patton | G06F 8/61 |
| | | | 717/131 |
| 2017/0054792 A1* | 2/2017 | Christopher, II | H04L 67/32 |
| 2017/0060562 A1* | 3/2017 | Lopez | G06F 8/60 |

OTHER PUBLICATIONS

LaCharite, "How to Add Beta Testers to Your Skills Before You Publish", Alexa Blogs, published May 17, 2016, <https://developer.amazon.com/blogs/post/Tx2EN8P2AHAHO6Y/How-to-Add-Beta-Testers-to-Your-Skills-Before-You-Publish> (Year: 2016 ).*

Irvine, Megan, and Jason Maddocks. "Enabling mobile apps with IBM worklight application center." IBM Redbooks, 2013, Chapter 3, pp. 45-85 (Year: 2013).*

"Share your skill". Amazon Skill Blueprints. published 2018, <https://blueprints.amazon.com/help/share-your-skill>, accessed Oct. 23, 2019 (Year: 2018).*

"Publishing Cortana Skills", https://docs.microsoft.com/en-us/cortana/publishing/publishing, Published on: Apr. 10, 2017, 7 pages.

"Skills Beta Testing", https://developer.amazon.com/public/solutions/alexa/alexa-skills-kit/docs/skills-beta-testing, Retrieved on: May 17, 2017, 9 pages.

"Testing & Debugging Best Practices", https://docs.microsoft.com/en-us/cortana/testing/testing-and-debugging, Published on: Mar. 30, 2017, 7 pages.

"Creating and testing a Cortana Skill with Microsoft Bot Framework", http://www.garypretty.co.uk/, Published on: May 10, 2017, 15 pages.

Costello, Martin, "Publishing My First Alexa Skill", https://blog.martincostello.com/publishing-my-first-alexa-skill/, Published on: Feb. 20, 2017, 5 pages.

"Submitting an Alexa Skill for Certification", https://developer.amazon.com/public/solutions/alexa/alexa-skills-kit/docs/publishing-an-alexa-skill, Retrieved on: May 17, 2017, 3 pages.

Catanzariti, Patrick, "How to Build Your Own AI Assistant Using Api.ai", https://www.sitepoint.com/how-to-build-your-own-ai-assistant-using-api-ai/, Retrieved on: May 17, 2017, 34 pages.

Helmy, Yasmine, "The Beginner's Guide for Beta Testing Your App!", http://blog.instabug.com/2015/07/the-beginners-guide-for-beta-testing-your-app/, Published on: Jul. 21, 2015, 15 pages.

Amadeo, Ron, "Google launches a beta channel for the Android Google app", https://arstechnica.com/gadgets/2015/10/google-launches-a-beta-channel-for-the-android-google-app/, Published on: Oct. 19, 2015, 3 pages.

* cited by examiner

VIRTUAL ASSISTANT SKILL DEPLOYMENT

CLAIM OF PRIORITY

This application claims the benefit of priority to U.S. Provisional Application Ser. No. 62/503,632, filed on May 9, 2017, and which is incorporated herein by reference in its entirety.

BACKGROUND

Virtual assistants (also known as "intelligent personal assistants") are software applications that can perform various tasks and services for users. Virtual assistants may be implemented using a variety of different computing devices, and may respond to a variety of commands from users. The various features of virtual assistants may be referred to as "skills" of the virtual assistant.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
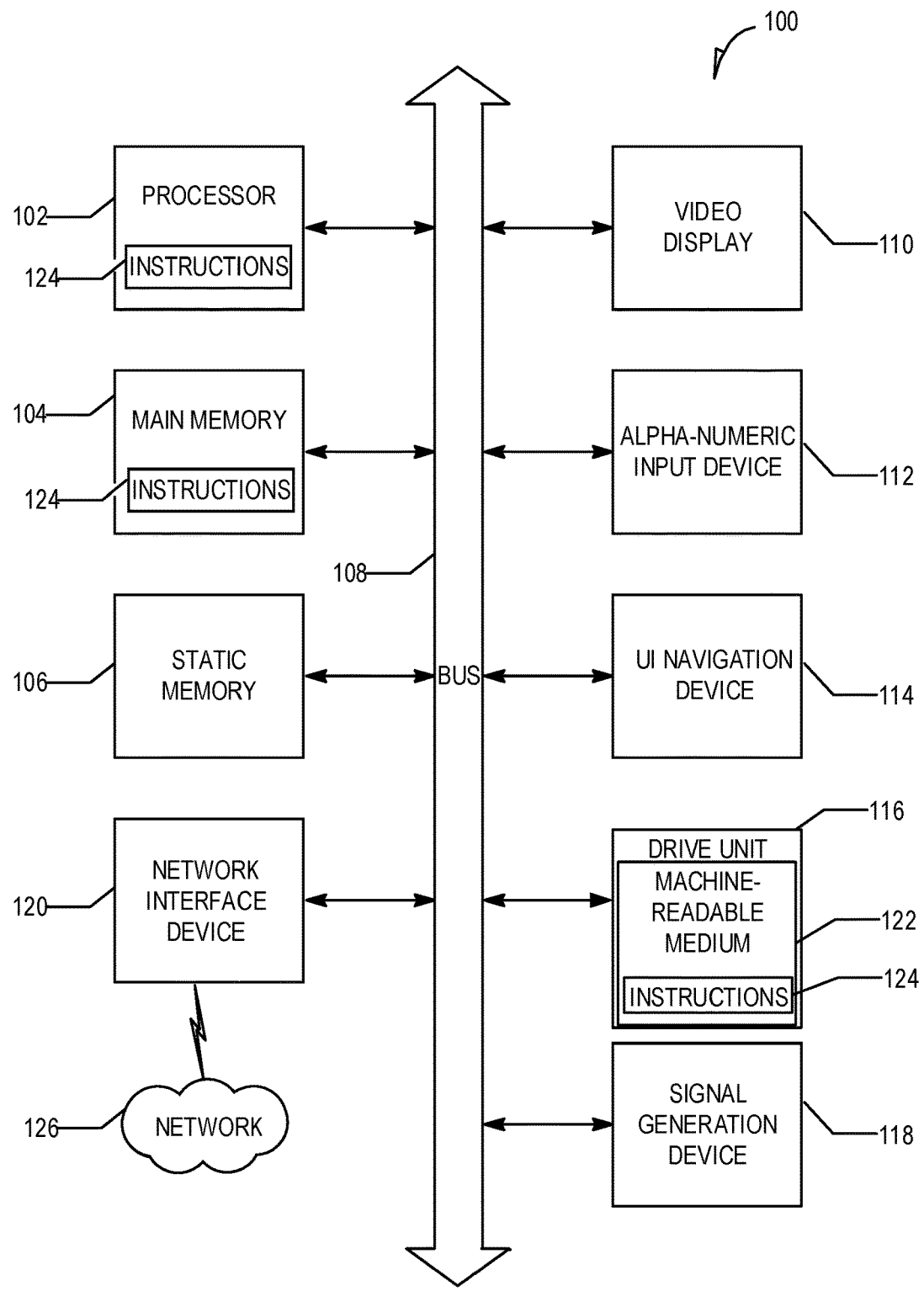
FIGS. 1 and 2 are block diagrams illustrating exemplary systems according to various aspects of the disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure help improve virtual assistant systems by providing dynamic, customizable deployment groups for virtual assistant software features. Users, such as software developers, can deploy and remove software packages from different groups, and precisely define the members in any number of different deployment groups that can access the deployed virtual assistant software.

Embodiments of the present disclosure described herein may be implemented using any combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Embodiments of the present disclosure may include, or may operate in conjunction with, various logic, components, modules, and mechanisms. Such components may include any combination of hardware, software, or firmware communicatively coupled to one or more processors in order to carry out the operations described herein. Components may be hardware components, and as such components may be considered tangible entities capable of performing specified operations and may be configured or arranged in a certain manner. For example, circuits may be arranged (e.g., internally or with respect to external entities such as other circuits) in a specified manner as a component. The whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In some exemplary embodiments, software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform the methodologies described herein.

FIG. 1 is a block diagram illustrating an exemplary embodiment of a computer system 100, within which a set or sequence of instructions may be executed to cause the system to perform any of the functionality discussed herein. In some exemplary embodiments, the system 100 may operate as a standalone device or may be connected (e.g., networked) to other machines. In a networked deployment, the system may operate in the capacity of either a server or a client system in server-client network environments, or it may act as a peer machine in peer-to-peer (or distributed)

network environments. The system may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine.

While only a single computer system is illustrated in FIG. 1, the terms "system," "machine," or "device" may include any collection of systems, machines, or devices that individually or jointly perform various functionality of the embodiments of the present disclosure. Similarly, the term "processor-based system" may include any set of one or more machines that are controlled by or operated by a processor (e.g., a computer) to individually or jointly execute instructions to perform any one or more of the methodologies discussed herein.

The exemplary computer system 100 in FIG. 1 includes a processor 102 (e.g., a central processing unit (CPU), a graphics processing unit (GPU) or both, processor cores, compute nodes, etc.), a main memory 104 and a static memory 106, which communicate with each other via a link 108 (e.g., bus). The computer system 100 may further include a video display unit 110, an alphanumeric input device 112 (e.g., a keyboard), and a user interface (UI) navigation device 114 (e.g., a mouse). In one embodiment, the video display unit 110, input device 112 and UI navigation device 114 are incorporated into a touch screen display. The computer system 100 may additionally include a storage device 116 (e.g., a drive unit), a signal generation device 118 (e.g., a speaker), a network interface device 120, and one or more sensors (not shown), such as a global positioning system (GPS) sensor, compass, accelerometer, or other sensor.

The storage device 116 includes a machine-readable medium 122 on which is stored one or more sets of data structures and instructions 124 (e.g., software) embodying or utilized by any one or more of the methodologies or functions described herein. The instructions 124 may also reside, completely or at least partially, within the main memory 104, static memory 106, and/or within the processor 102 during execution thereof by the computer system 100, with the main memory 104, static memory 106, and the processor 102 also constituting machine-readable media.

While the machine-readable medium 122 is illustrated to be a single medium, the term "machine-readable medium" may include a single medium or multiple media (e.g., a centralized or distributed database, and/or associated caches and servers) that store the one or more instructions 124. The term "machine-readable medium" may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" may include, for example, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 124 may be transmitted or received over a communications network 126 using a transmission medium via the network interface device 120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

In various exemplary embodiments of the present disclosure, filters may be used to narrow down a set of items in a repository to a set of items that match a particular set of criteria. For example, when browsing a SharePoint document library, users can use filters associated with column headings to filter documents by their value in the associated column. Additionally, embodiments of the disclosure can provide smart filter suggestions based on the shape of the data a user is currently looking at.

Figure 2:
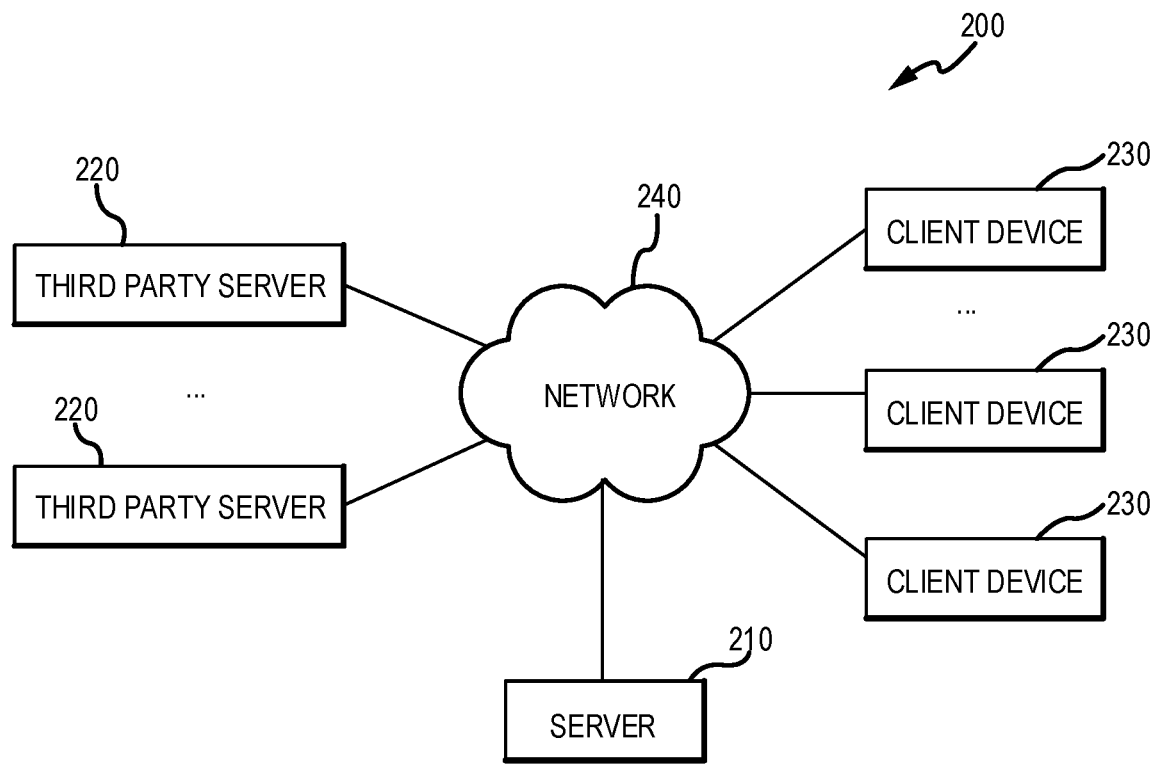

FIG. 2 illustrates another exemplary system in accordance with various aspects of the disclosure. In this example, system 200 includes a server computer system 210 that communicates with one or more third party server computer systems 220 and one or more client devices 230 over a network 240. Any of computer systems 210, 220, or 230 may include any desired components, such as any of the components described above for system 100 in FIG. 1.

Figure 3:
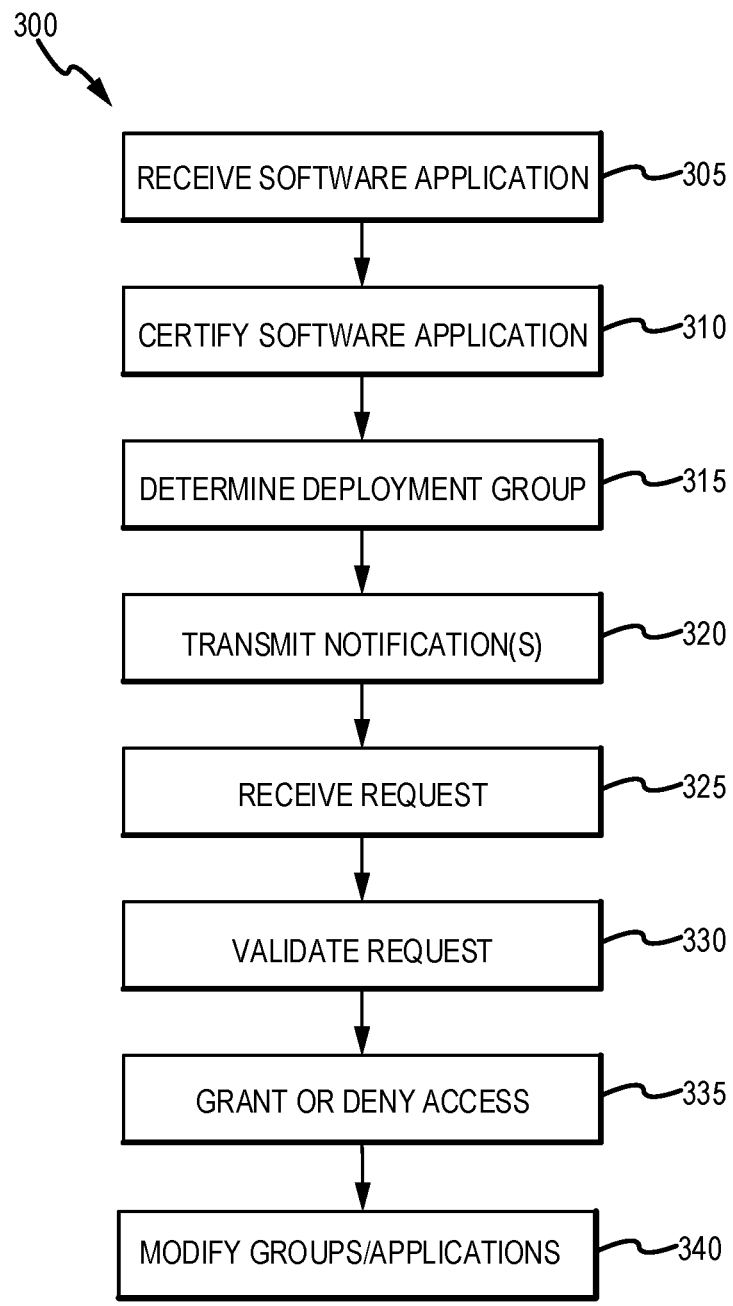
FIG. 3 is a flow diagram illustrating an exemplary method according to various aspects of the disclosure.

FIG. 3 depicts an exemplary process according to various aspects of the present disclosure. In this example, method 300 includes receiving a software application (305), certifying the software application (310), determining a deployment group for the software application (315), and transmitting a notification to each respective member of the deployment group that the software application is available to the group (320). Method 300 further includes receiving (325) and validating (330) requests, granting or denying access to the software application (335), and modifying a software application and/or group (340). The steps of method 300 may be performed in whole or in part, may be performed in conjunction with each other as well as with some or all of the steps in other methods, and may be performed by any number of different systems, such as the systems described in FIGS. 1 and 2.

Embodiments of the present disclosure allow developers of virtual assistant software applications (e.g., "skills" for the virtual assistant) to identify deployment groups of individuals to grant access to their software, and to easily and dynamically configure the size and membership of such groups. Among other things, this helps developers release their software incrementally (e.g., to different groups of testers) to test virtual assistant skills before releasing the skill to the public. This also allows developers to customize groups to allow skills to be used in personalized, targeted scenarios, thus allowing for specific use cases to be tested quickly and efficiently. From the perspective of users of the skills, the embodiments of the present disclosure provide easy visibility into the virtual assistant skills in each deployment group, and helps to avoid confusion among general users as skill features are added, removed, or modified during testing. Moreover, while the embodiments of the present disclosure focus on the deployment of software for virtual assistants, various features of the present disclosure may be applicable to the deployment of other forms of software as well.

Embodiments of the present disclosure may receive (305) an entire software application, parts of a software application, source code, binaries, links or references to software applications, as well as combinations thereof. In some embodiments, a third party server (e.g., third party server 220 in FIG. 2) may host the deployed software application, and send meta data regarding the application to a system implementing the functionality of method 300 (e.g., server 210). The server 210, in turn, can act as an intermediary to provide access by client computing devices (e.g., client devices 230) to the deployed skill hosted on the third party server 220. In other embodiments, the server 210 may receive and manage copies of the software application, including different versions and updates, and provide access to client devices to such applications directly in order to provide the skills and functionality in the software application to the respective virtual assistant on a respective user's client device.

The system may transmit and receive information using any suitable electronic communication and any suitable communications medium, such as network 240 in FIG. 2. In this context, an "electronic communication" may include a data packet, text message, email, and/or any other type of electronic communication in any desired format. In some embodiments, the system may provide a web-based interface for developers, publishers, and others to deploy software applications and to add, delete, and modify deployment groups and software application versions deployed to such groups.

The system may certify (310) a software application before deploying the application to a deployment group or transmitting notifications to users in a deployment group that the software application is available. Certification may include, for example, testing of the application for errors, viruses/malware/etc., verification of the publisher or developer of the application (e.g., that the developer is qualified to release software to users of the system, and other tests.

The system may determine a deployment group (315) in which to deploy the software application based on the software application, meta data or other data associated with the software application, input from a developer or other user of the third party system publishing or deploying the software application, and/or other information. In some cases, the deployment group in which a software application is deployed may be pre-existing. In other cases, the third party server identifies the members of a new deployment group for the system to create.

In one particular example, a third party server 220 may transmit an electronic communication containing a software application (or a link to access the software application on the third party server) over the network 240 to the server 210. The electronic communication in this example may further include meta data associated with the software application, such as a title of the software application, its version number, and the like. The meta data may further include identification information for a deployment group, such as the name of the deployment group, email addresses or other information for members of the deployment group, etc. A deployment group may include any number of members (including groups with one or more members common to different groups and groups with completely different members), and the system may maintain any desired number of deployment groups.

The system may notify (320) the members of a deployment group that the software application has been deployed to the deployment group. In some cases, the application, link to the application, download instructions, or other information may be transmitted, for example, in an electronic communication from the server 210 to a client device of a user in the deployment group 230 via network 240. In other embodiments, the system may publish the notification to a website accessible by the members of the deployment group.

Figure 4:
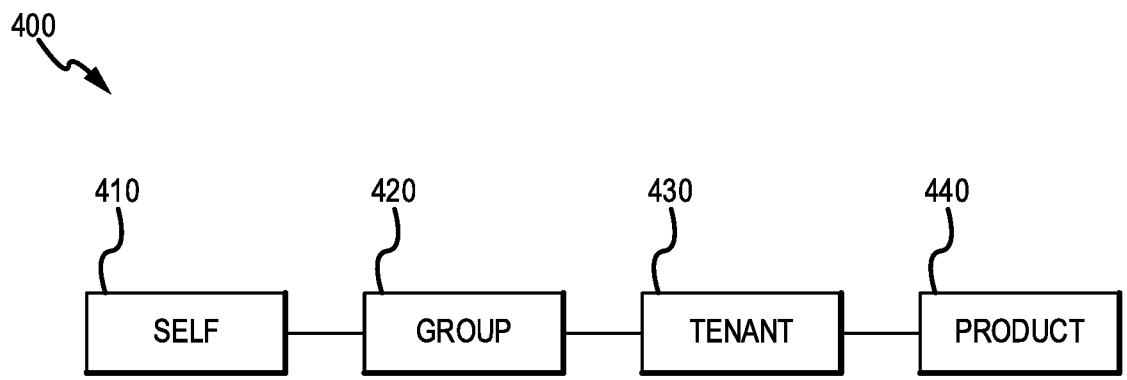
FIG. 4 is a diagram illustrating an exemplary set of deployment groups according to various aspects of the disclosure.

FIG. 4 depicts an exemplary set of deployment groups 400. In this example, four groups are depicted: a "self" group 410, a "group" group 420, a "tenant" group 430, and a "product" group 440. The groups 400 in this example are also arranged (from left to right) based on size, with the smallest number of members on the left (self group 410) and the largest on the right (product group 440). Developers, publishers, and other users (e.g., of the third party servers 220) responsible for the software application may define the membership of the deployment groups in conjunction with submitting the software application for deployment.

For example, a developer may define the "self" group as simply including a single developer, or a team of developers responsible for the software application by submitting the email address(es) of the members in an electronic communication to the server 210. Likewise, the developer may define development groups 420 and 430 as including various other sets of software developers, testers, and other individuals and groups based on the developer's preferences. In the example shown in FIG. 4, the product development group 440 includes all virtual assistant users, and thus represents a full product release, while groups 410, 420, and 430 represent groups for intermediate releases and testing.

While four development groups are shown in the example depicted in FIG. 4, embodiments of the present disclosure may operate in conjunction with any number of development groups. Different development groups may have the same, or different members, and there may be multiple instances of the same development group. For example, a developer might choose to deploy a first virtual assistant skill software package to a first instance of group 420 for testing, and deploy a second virtual assistant software package to a second instance of group 420. In this example, the first and second instances of the group include the same members, but a different software package is deployed to each instance.

The system may receive various requests (325) from third party servers, client devices of virtual assistant users, other systems and devices. For example, the system may receive a request (e.g., in an electronic communication from a client device 230 over network 240) for the software application, access to the software application (e.g., hosted on the third party server), or information regarding the software application (e.g., features and virtual assistant skills offered by the software application). The system may validate the request (330) and determine whether the user is part of a deployment group that has been granted access to the software application. In response to determining the requesting user is a member of such a deployment group, the system grants access to the software application, while denying access in response to determining the requesting user is not a member of such a group. Validation may be performed based on any desired authentication procedure, such as requiring the requesting user to enter a password or comply with another authentication protocol.

The system may also receive and process requests from developers, publishers and other users involved in producing virtual assistant software. For example, the system may receive (e.g., in an electronic communication from a third party server 220 over network 240) a request to modify a deployment group and/or software application.

For example, a developer associated with a third party server 220 may send a request to add the software application to multiple groups, move a software application from one group to another, or to copy an existing software application from one group to one or more additional groups. In a particular example, a developer may send an electronic communication from a third party server 200 to server 201 over network 240 containing a request to add a software application (that was previously added to a first group) to a second group. The system may then create a copy of the system on the system and notify (320) the members of the second deployment group that the copy of the application is available. Alternatively, the system may direct users in the deployment group to the application hosted on the third party server 220.

Subsequently, the developer may independently or collectively modify the different versions of the software application in different deployment groups. For example, the developer may transmit a first modification to be applied to the software application in the first deployment group that does not affect the software application in the second deployment group. Likewise, the developer may transmit a second software modification (e.g., different from the first modification) for application to the software application in the second deployment group, but that does not affect the software application in the first deployment group. The developer could also apply a modification to both software applications. In this manner, a developer can maintain different versions of a software application in different groups, applying modifications selectively to be tested by different groups of users.

Developers and other users may provide other types of requests to the system. For example, developers may transmit requests to exert various controls over deployments, such as cancelling a deployment's certification process, rolling back a completed deployment, and viewing existing deployments associated with the developer.

In some embodiments, the system may enforce a promotion scheme (e.g., defined by the developer) as to how software applications progress from one deployment group to another. In FIG. 4, for example, the deployment groups 400 are arranged such that deployments start at the self group 410 and can be migrated forward (i.e., to the right to groups 420, 430, and/or 440). In one particular example, the system allows deployments from left to right in the set of groups 400, but not right to left. Accordingly, a self-deployed skill can move into the group 420, tenant 430, or product 440 groups, while Group-deployed skills can move into the tenant 430 or product 440 groups, and tenant-deployed skills can move into the product group 440. In alternate embodiments, a developer may be allowed to promote or demote deployments as desired, so a deployment to the tenant group 420 could be rolled back to self 410 or group 420 or promoted to product 440.

Figure 5:
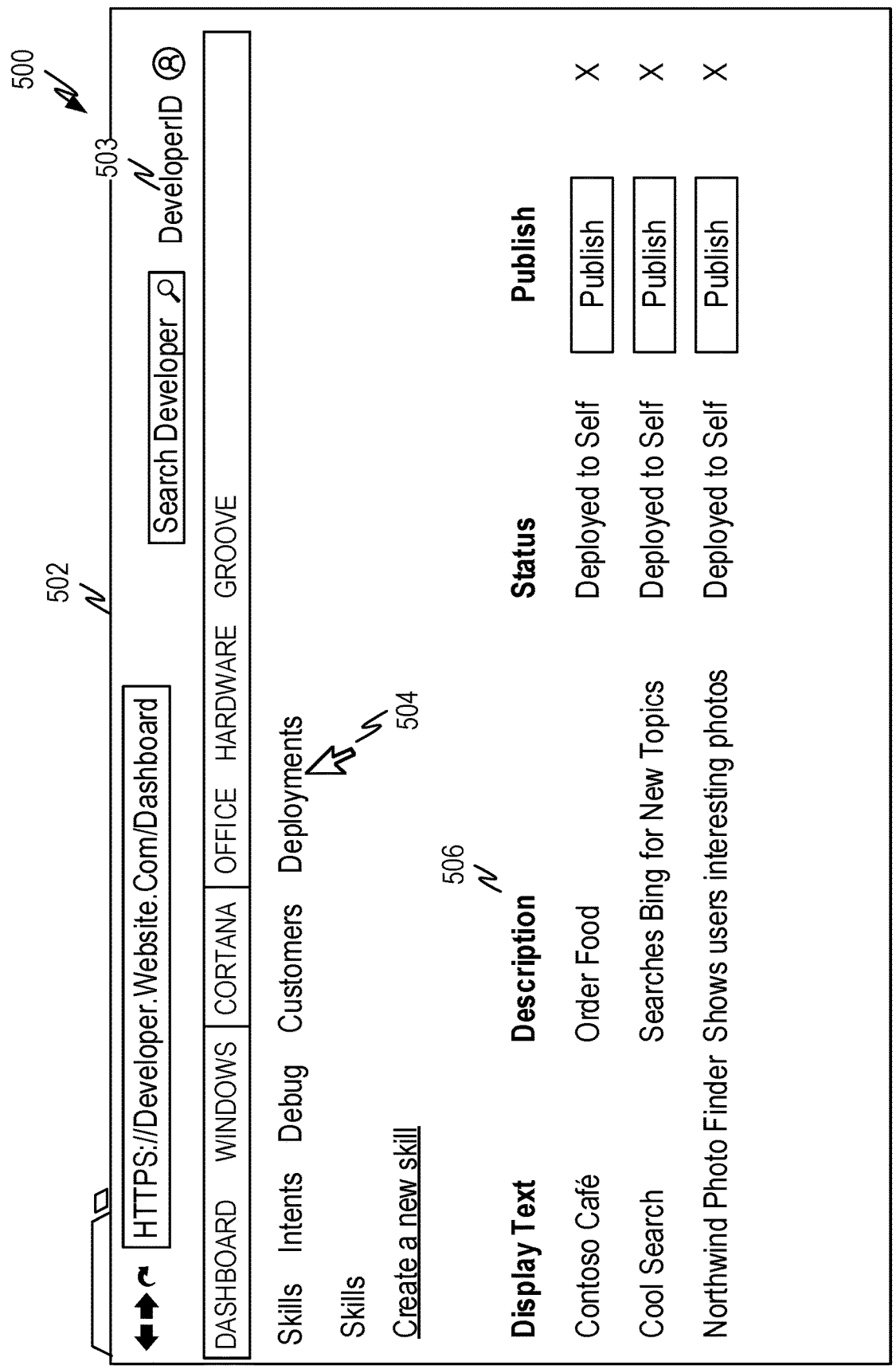
FIG. 5 is a diagram illustrating a developer user interface that allows a developer to see and manage all skill deployments.

FIG. 5 is a diagram illustrating a developer user interface shown generally as 500 that allows a developer to see and manage all skill (e.g., for the virtual assistant) deployments. The developer user interface 502 can present a developer dashboard that allows a developer to interact with the various servers and/or systems described herein, such as submitting skills for deployment, managing deployment groups, managing deployment, and so forth.

As described herein, skills that a developer creates are associated with an account, such as a developer account. The user interface 503 comprises a developerID 504 that identifies a developer and/or the developer's account.

In order to manage all a developer's deployments, the user interface 502 can comprise a plurality of menu and/or user interface controls. To simplify the discussion, menu items and user interface controls will simply be referred to as controls. Furthermore, although the dashboard comprises numerous controls, only those controls that are relevant to the scenario of a developer managing deployments will be discussed.

In user interface 502, a set of controls exist labeled "Skills," "Intents," "Debug," "Customers," and "Deployments." The user interface also has an information area 506 where information and/or controls associated with the currently activated control can be displayed. For example, in FIG. 5, the information area displays skills associated with the developer account.

By activating the deployment control, such as by placing a cursor 504 on the deployment control and clicking, touching, and/or so forth, the information area 506 can display information associated with a developer's deployed skills.

Figure 6:
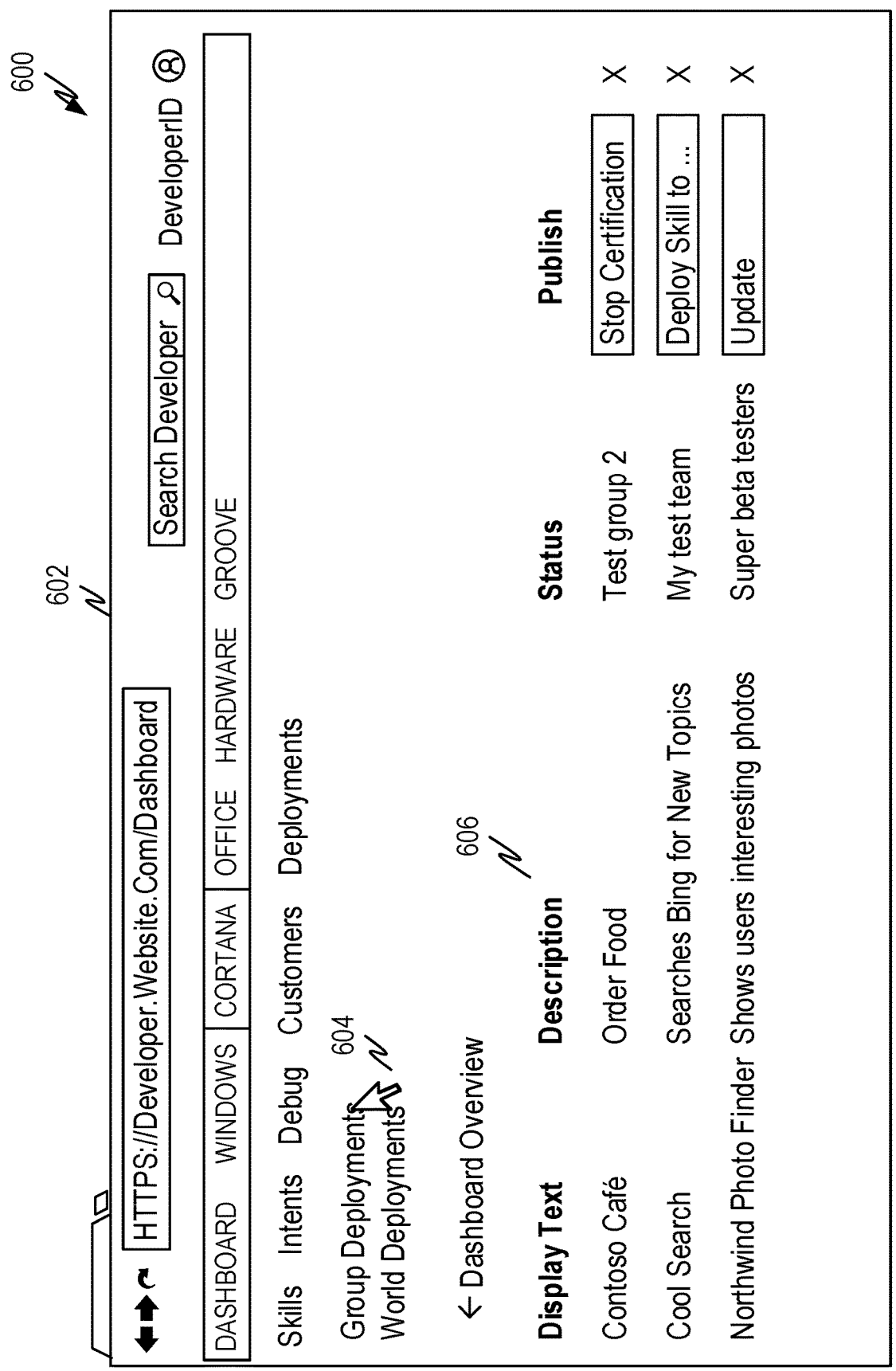
FIG. 6 is a diagram illustrating a developer user interface that allows a developer to see and manage skill deployments by deployment group.

FIG. 6 is a diagram illustrating a developer user interface shown generally as 600 that allows a developer to see and manage skill deployments by deployment group. After activating the deployments control described in FIG. 5, the user interface 602 can present additional controls that allow a developer to identify various deployment groups and display all the skills deployed to that deployment group. For example, FIG. 6 illustrates a "group deployments" control and a "world deployments" control, each of which, when activated display the skills deployed in the associated deployment group. For example, activating the group deployments control as shown by cursor 604, can bring up all skills deployed at the group deployment level (e.g., group level 420 of FIG. 4).

The information area 606 shows three entries as an example. The columns in the information area 606 are the "display text" column, which contains the associated display text of the skill, the "description" column, which contains a description of the skill, the "status" column which identifies the group the skill has been deployed to, a "publish" column that allows an additional action to be taken, and an "X" which will remove the skill from deployment as described below.

Figure 7:
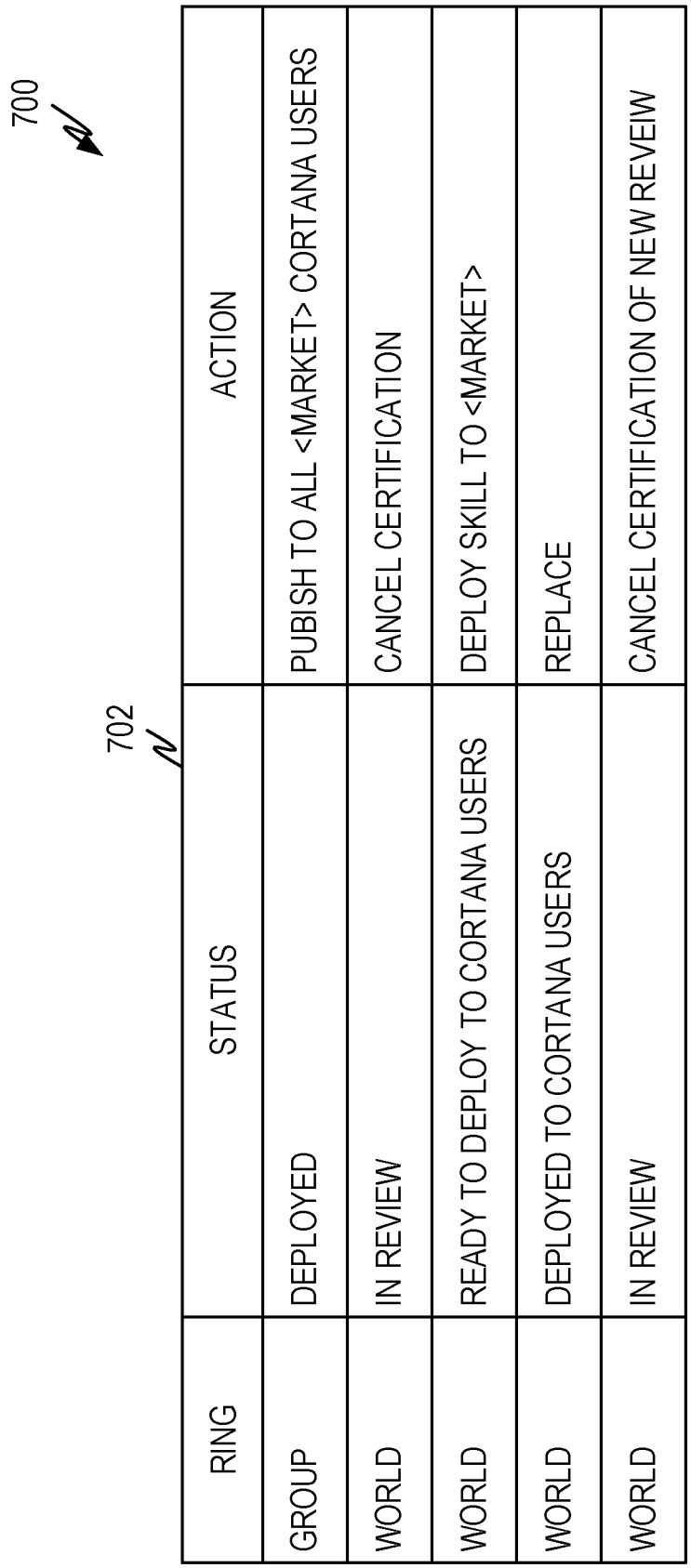
FIG. 7 is a diagram illustrating sample deployment states.

FIG. 7 is a diagram illustrating sample deployment states shown in a table generally as 700. The table 702 contains sample deployment states that can be associated with a skill. The "ring" column describes the deployment group, the "status" column describes the current status of the deployed skill, the "action" column describes example actions associated with the current status. In other words, the action described in the action column can be taken when the deployed skill is deployed in the deployment group shown in the ring column and the current status is the status shown in the status column.

For example, when a skill is deployed at the group level, and the status is deployed, the action can be to publish the skill to all users in the <market>. When the skill is deployed at the world level, and the status is in review, the action can be to cancel certification. The remainder of the deployment groups, status, and associated actions are as shown in table 702.

Figure 8:
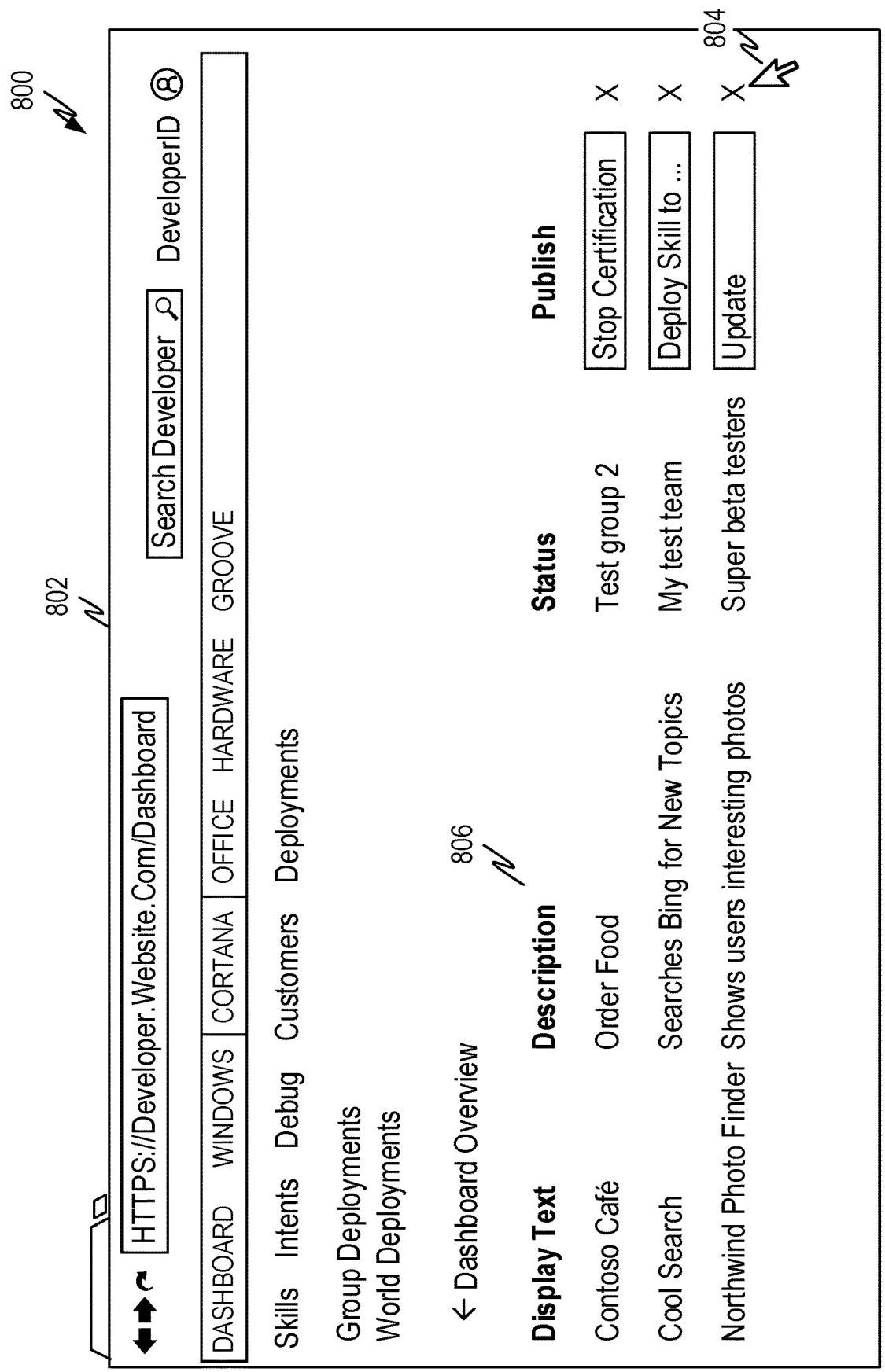
FIG. 8 is a diagram illustrating a developer user interface that allows a developer to revoke a skill deployment.

FIG. 8 is a diagram illustrating a developer user interface shown generally as 800 that allows a developer to revoke a skill deployment. Once a user selects a deployment group, (e.g., group deployments as described in conjunction with FIG. 7), the user interface 802 can have the displayed information in the information area 806.

If a developer wishes to remove a skill (e.g., cancel a deployment), the developer can activate an appropriate control, such as the "X." This is illustrated in FIG. 8 by the cursor 804 being placed over the "X" associated with the skill the developer wishes to remove (e.g., revoke the deployment).

Figure 9:
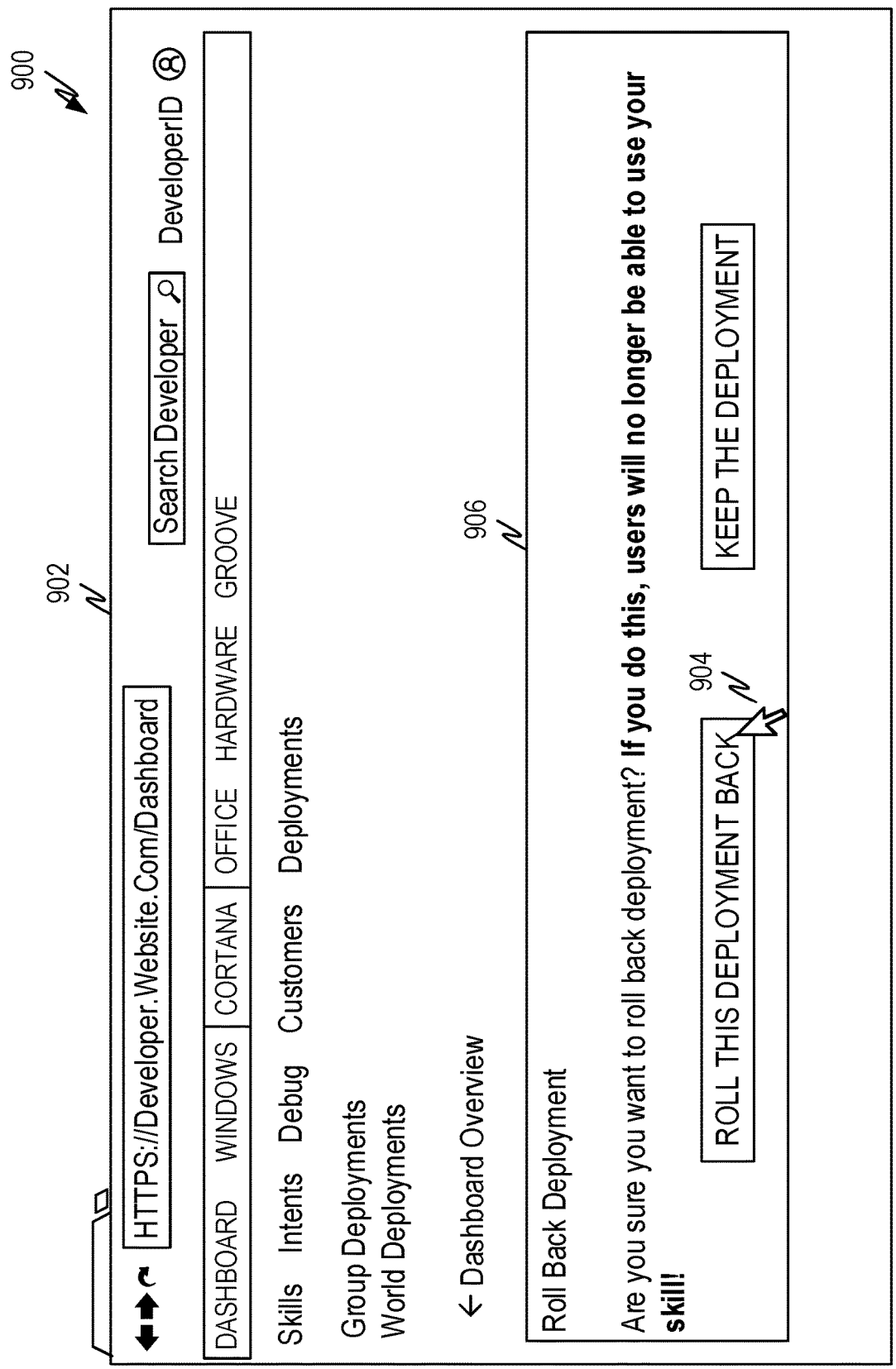
FIG. 9 is a diagram illustrating a developer user interface that allows a developer to revoke a skill deployment.

FIG. 9 is a diagram illustrating a developer user interface shown generally as 900 that allows a developer to revoke a skill deployment. Once the developer activates the appropriate control to revoke a deployed skill as shown in FIG. 8, the user interface 902 can display information to allow the developer to confirm that they want to revoke the deployment of the skill. In FIG. 9, the user interface 902 illustrates a pop-up dialog 906 which informs the developer that they have selected a control to revoke a skill. The dialog 906 can inform the developer the impact this will have, such as informing the developer that users will no longer be able to use the skill.

The dialog 906 can comprise confirmation controls and cancel controls, such as those illustrated, where the developer can activate the "roll this deployment back" control if she wishes to revoke the deployment or the "keep this deployment" if the developer wishes to keep the deployment. In the illustrated figure, the developer revokes the deployment by activating the appropriate control as shown by cursor 904.

Figure 10:
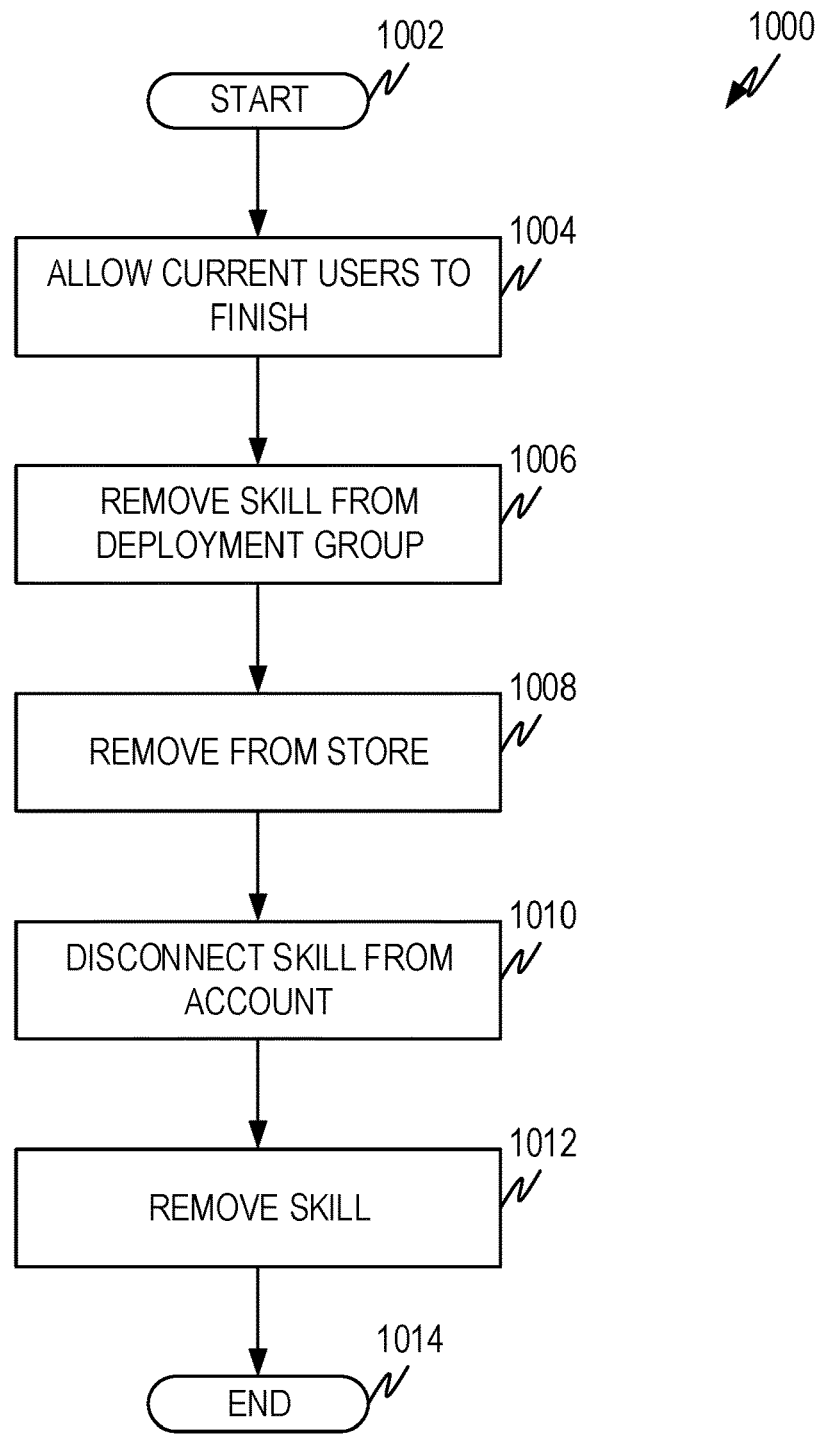
FIG. 10 is a flow diagram illustrating revocation of a skill deployment.

FIG. 10 is a flow diagram 1000 illustrating revocation of a skill deployment. The method would be executed, for example, when a developer indicates through activation of the appropriate control(s) that a particular skill deployment should be revoked.

The method begins at operation 1002 and proceeds to operation 1004. In operation 1004, users who are currently using the skill (e.g., have an active dialog/conversation that involves the skill) are allowed to complete their conversation.

In operation 1006, the skill is removed from the current deployment group level. Thus, a skill deployed at the group level is removed from that level. A skill deployed at the world or product level is removed from that level, and so forth.

For deployment group levels that have made the skill available in a store or marketplace, the skill is also removed from the store as shown in operation 1008. For example, skills that are deployed to a product or world level can be listed in the store so users can find and install them. Operation 1008 removes the skill from any store that the skill is deployed to.

In operation 1010, the skill is disconnected from its associated account, such as the associated developer account.

Finally, in operation 1012, the skill is removed. The method ends at operation 1014.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Where a phrase similar to "at least one of A, B, or C," "at least one of A, B, and C," "one or more A, B, or C," or "one or more of A, B, and C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
a processor; and
memory coupled to the processor and storing instructions that, when executed by the processor, cause the system to perform operations comprising:
receiving, over a network from a third party computer system, an electronic communication that includes:
a skill for providing functionality to a virtual assistant; and
meta data associated with the skill;
in response to receiving the electronic communication:
connect the skill to an account associated with a developer;
identifying a first deployment group of one or more users based on the meta data; and
responsive to identifying the first deployment group, transmitting over the network an electronic communication containing a notification that the skill is available to a respective client computing device of each user in the first deployment group;
receiving a request from the developer to roll-back deployment to the first deployment group;
responsive to the request to roll-back deployment:
allow any users currently using the skill to complete their utilization of the skill;
remove the skill from the first deployment group;
disconnect the skill from the connected account; and
remove the skill from the system to preclude access to the skill by users.

2. The system of claim 1, wherein the memory further stores instructions for causing the system to certify the received skill prior to transmitting the respective electronic communications to the one or more users in the first deployment group.

3. The system of claim 1, wherein the memory further stores instructions for causing the system to perform operations comprising:
receiving, over the network from a client computing device of a user in the first deployment group, an electronic communication containing a request for the skill;
validating the request to determine that the requesting user is in the first deployment group; and
granting access to the skill for the requesting user based on the validation.

4. The system of claim 1, wherein the memory further stores instructions for causing the system to perform operations comprising:
receiving, over the network from a client computing device of a user not in the first deployment group, an electronic communication containing a request for the skill;
validating the request to determine that the requesting user is not in the first deployment group; and
denying access to the requesting user based on the validation.

5. The system of claim 1, wherein the memory further stores instructions for causing the system to perform operations comprising:
    receiving, over the network from the third party computer system, an electronic communication that includes a request to add the skill to a second deployment group associated with a second group of one or more users;
    in response to the request to add the skill to the second deployment group, creating a copy of the skill on the system; and
    transmitting, over the network to a respective client computing device for each respective user in the second deployment group, a respective electronic communication containing a notification that the copy of the skill is available to the respective user.

6. The system of claim 5, wherein the memory further stores instructions for causing the system to perform operations comprising:
    receiving, over the network from the third party computer system, a first modification to the skill in the first deployment group, wherein the first modification does not affect the skill in the second deployment group.

7. The system of claim 6, wherein the memory further stores instructions for causing the system to perform operations comprising:
    receiving, over the network from the third party computer system, a second modification to the skill in the second deployment group, wherein the second modification is different from the first modification, and wherein the second modification does not affect the skill in the first deployment group.

8. The system of claim 5, wherein the memory further stores instructions for causing the system to perform operations comprising:
    receiving, over the network from the third party computer system, a modification to the skill; and
    applying the modification to the skill in the first deployment group and the skill in the second deployment group.

9. The system of claim 5, wherein the first deployment group has a different number of users than the second deployment group.

10. The system of claim 5, wherein the first deployment group has a common user with the second deployment group.

11. A computer-implemented method comprising:
    receiving, by a computer system over a network from a third party computer system, an electronic communication that includes:
    a skill for providing functionality to a virtual assistant; and
    meta data associated with the skill;
    in response to receiving the electronic communication:
        connect the skill to an account associated with a developer;
        identifying a first deployment group of one or more users based on the meta data;
    responsive to identifying the first deployment group, transmitting an electronic communication containing a notification that the skill is available to a respective client computing device of each user in the first deployment group;
    receiving a request from the developer to roll-back deployment to the first deployment group; and
    responsive to receiving the request to roll-back deployment:
        allowing any users currently using the skill to complete their utilization of the skill;
        removing the skill from the first deployment group;
        disconnecting the skill from the connected account; and
        removing the skill from the computer system to preclude access to the skill by users.

12. The method of claim 11, further comprising certifying the received skill prior to transmitting the respective electronic communications to the one or more users in the first deployment group.

13. The method of claim 11, further comprising:
    receiving, over the network from a client computing device of a user in the first deployment group, an electronic communication containing a request for the skill;
    validating the request to determine that the requesting user is in the first deployment group; and
    granting access to the skill for the requesting user based on the validation.

14. The method of claim 11, further comprising:
    receiving, over the network from a client computing device of a user not in the first deployment group, an electronic communication containing a request for the skill;
    validating the request to determine that the requesting user is not in the first deployment group; and
    denying access to the requesting user based on the validation.

15. The method of claim 11, further comprising:
    receiving, over the network from the third party computer system, an electronic communication that includes a request to add the skill to a second deployment group associated with a second group of one or more users;
    in response to the request to add the skill to the second deployment group, creating a copy of the skill on the computer system; and
    transmitting, over the network to a respective client computing device of each respective user in the second deployment group, a respective electronic communication containing a notification that the copy of the skill is available to the respective user.

16. The method of claim 15, further comprising:
    receiving, over the network from the third party computer system, a first modification to the skill in the first deployment group, wherein the first modification does not affect the skill in the second deployment group.

17. The method of claim 16, further comprising:
    receiving, over the network from the third party computer system, a second modification to the skill in the second deployment group, wherein the second modification is different from the first modification, and wherein the second modification does not affect the skill in the first deployment group.

18. The method of claim 15, further comprising:
    receiving, over the network from the third party computer system, a modification to the skill; and
    applying the modification to the skill in the first deployment group and the skill in the second deployment group.

19. The method of claim 15, wherein the first deployment group has a different number of users than the second deployment group.

20. A non-transitory computer-readable medium storing instructions that, when executed by a computer system, cause the computer system to perform operations comprising:

receiving, over a network from a third party computer system, an electronic communication that includes:
   a skill for providing functionality to a virtual assistant; and
   meta data associated with the skill;
in response to receiving the electronic communication:
   connecting the skill to an account associated with a developer;
   identifying a first deployment group of one or more users based on the meta data;
   responsive to identifying the first deployment group, transmitting over the network an electronic communication containing a notification that the skill is available to a respective client computing device of each user in the first deployment group;
   receiving a request from the developer to roll-back deployment to the first deployment group; and
   responsive to receiving the request to roll-back deployment:
      allowing any users currently using the skill to complete their utilization of the skill;
      removing the skill from the first deployment group;
      disconnecting the skill from the connected account; and
      removing the skill from the computer system to preclude access to the software application skill by users.

\* \* \* \* \*